United States Patent

[15] 3,688,207

Morris

[45] Aug. 29, 1972

[54] HIGH SPEED TUNABLE MASER FOR USE IN RADAR AND COMMUNICATION RECEIVERS

[72] Inventor: Lewis C. Morris, Cheltenham, Pa.

[73] Assignee: Radio Corporation of America

[22] Filed: March 20, 1967

[21] Appl. No.: 624,407

[52] U.S. Cl..........................330/4, 343/5 R, 325/333
[51] Int. Cl. ..............................H01s 1/00, G01s 9/08
[58] Field of Search.......343/5; 330/4; 325/333, 334, 325/435, 445, 448, 462, 485

[56] References Cited

UNITED STATES PATENTS

| 3,056,127 | 9/1962 | Harris | 343/5 |
| 3,117,282 | 1/1964 | Wessel | 330/4 X |
| 3,213,281 | 10/1965 | Nedderman | 330/4 X |

Primary Examiner—Benjamin A. Borchelt
Assistant Examiner—H. A. Birmiel
Attorney—Edward J. Norton

[57] ABSTRACT

The technique of tuning a maser at a high rate is used for improving radar receivers and communication receivers.

In radar receivers, the maser which is used as the first stage thereof, is detuned from the radar transmitter frequency during the time interval in which each exploratory pulse is being transmitted. This avoids the need for high power transmit-receive isolation means providing 80–90 db. of attenuation normally required in radar systems employing masers.

In communication receivers a single maser may be time divided between a plurality of different high gain narrow pass band channels.

3 Claims, 4 Drawing Figures

Patented Aug. 29, 1972

TRAVELING WAVE MASER MEANS

INVENTOR
Lewis C. Morris

BY Edward J Norton
ATTORNEY

Patented Aug. 29, 1972

INVENTOR
LEWIS C. MORRIS

BY Edward J. Norton
ATTORN-

HIGH SPEED TUNABLE MASER FOR USE IN RADAR AND COMMUNICATION RECEIVERS

The invention herein described was made in the course of or under a contract or subcontract thereunder with the Department of the Navy.

This invention relates to masers and, more particularly, to radar and communication receivers incorporating as a first stage thereof a maser which is frequency tunable at a very high rate.

As is well known in the art, a maser (microwave amplification by stimulated emission of radiation) when utilized at cryogenic temperatures provides very high gain amplification with a very high signal-to-noise ratio. It is therefore particularly useful as the first stage of a signal receiver for receiving a very low intensity signal.

In certain types of radar systems, such as a search radar for instance, where received echo pulses may be of very low intensity, it is desirable to utilize a maser amplifier as the first stage of the radar receiver of the system. HOwever, since in such a radar system the exploratory pulse transmitted by the radar transmitter thereof is of very high intensity, it has been necessary in the past to utilize transmit-receive isolation means (duplexing means) providing as much as 80–90 db. of attenuation between the transmitter and the receiver in order to prevent the very sensitive maser first stage of the receiver, which is tuned to the same frequency as the transmitter, from overloading and saturating both itself and the subsequent stages of the receiver. Such saturation cannot be tolerated in a radar system because the recovery time for saturated signals is much too long. On the other hand, the presence of transmit-receive isolation means providing 80–90 db. of attenuation contributes an excessive amount of noise input to the maser first stage of the radar receiver, thereby nullifying the main advantages (low noise and high signal-to-noise ratio) of utilizing a maser as the first stage of the radar receiver.

The present invention contemplates a maser which may be tuned from a first frequency to a second frequency at a rate which is at least 10 megahertz per microsecond. In the case of a radar system, the present invention contemplates utilizing such a tunable maser as the first stage of the radar receiver with the maser normally tuned to the frequency of the transmitted exploratory pulse. However, in accordance with the present invention, while the exploratory pulse is in the process of being transmitted, the maser is tuned to another frequency. This prevents any direct coupling of the transmitted exploratory pulse to the radar receiver, since the maser when tuned to this other frequency acts to attenuate rather than amplify any signal at the frequency of the exploratory pulse applied as an input thereto. Thus, in accordance with the present invention, the need for a transmit-receive isolation means providing 80–90 db. of attenuation, along with the excessive noise contributed thereby, is eliminated.

A high speed tunable maser is also useful as the first stage of a communication receiver designed to receive a plurality of different very weak signals each of which occupies a separate frequency channel. More particularly, as is well known, it is much simpler to provide high gain over a narrow frequency pass band than over a wide frequency pass band. In accordance with the present invention, a high speed tunable maser having a narrow pass band is utilized as the first stage of a communication receiver with the output of the maser being coupled as an input to each of a plurality of different frequency narrow pass band high gain channels. The maser may be selectively tuned at high speed to any one of the different channels.

It is therefore an object of the present invention to provide a maser which is tunable from one frequency to another frequency at a rate of at least 10 megahertz per microsecond.

It is a further object of the present invention to incorporate such a high speed tunable maser as the first stage of a radar receiver.

It is a still further object of the present invention to utilize such a high speed tunable maser as the first stage of a multi-frequency channel communication receiver.

These and other objects, features and advantages of the present invention will become more apparent from the following detailed description taken together with the accompanying drawing, in which.

Figure 1:
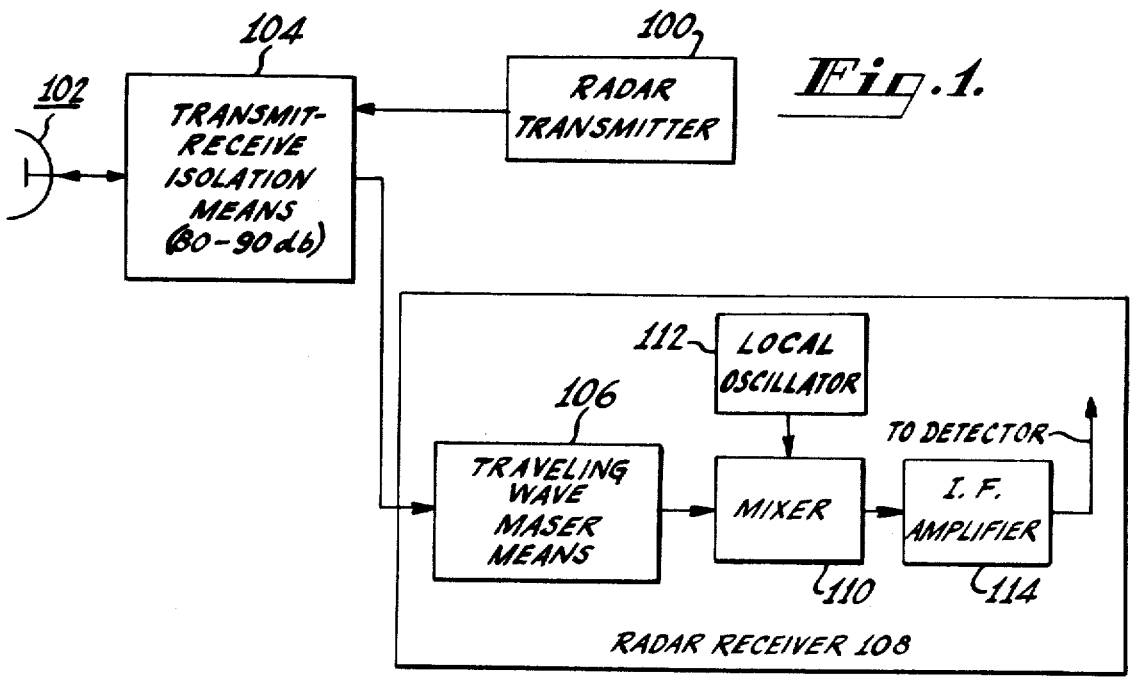
FIG. 1 is block diagram of a prior art radar system employing a radar receiver incorporating a traveling wave maser means as the first stage thereof.

Referring now to FIG. 1, the prior art radar system shown therein comprises radar transmitter 100 having its output coupled to antenna 102 through transmit-receive isolation means 104. Antenna 102 is also coupled to the input of traveling wave maser means 106 which is employed as the first stage of radar receiver 108.

Radar transmitter 100 applies exploratory pulses at a predetermined pulse repetition rate to antenna 102, as is well known in the art. These exploratory pulses are radiated from antenna 102 and, in the interval between the radiation of successive exploratory pulses, echo pulses are received by antenna 102. These echo pulses are applied to the input of traveling wave maser means 106.

The transmit-receive isolation means 104, which is inserted between antenna 102 and radar transmitter 100 and radar receiver 108, respectively, incorporates duplexers therein sufficiently high powered to ensure that the energy directly applied to the input of traveling wave maser means 106 during the pulse duration of each exploratory pulse is attenuated by 80–90 db.

As shown, the output of traveling wave maser means 106 is applied as a first input to mixer 110 of radar receiver 108, and the output of a local oscillator 112 of the radar receiver 108 is applied as a second input to mixer 110. The output of mixer 110 is applied as an input to I.F. amplifier 114 of radar receiver 108, and the output of the I.F. amplifier 114 is applied to the detector of radar receiver 108, all of which is conventional.

If it were not for the high degree of isolation provided by transmit-receive isolation means 104, traveling wave maser means 106, as well as mixer 110 coupled to the output thereof, would overload and saturate during the occurrence of each exploratory pulse from radar transmitter 100. Once overloaded and saturated, traveling wave maser means 106 and mixer 110 would recover only after the elapse of a time which is much longer than the actual duration of each exploratory pulse. Therefore, under this condition, radar receiver 108 would not be effective in detecting echo pulses received during this long recovery time.

The presence of transmit-receive isolation means 104 prevents such overloading and the saturation of traveling wave maser means 106 and mixer 110 of radar receiver 108. However, the high powered duplexers incorporated in transmit-receive isolation means 104 contribute so much noise to the system that the high sensitivity and high signal-to-noise ratio supplied by utilizing traveling wave maser means 106 is nullified.

Figure 2:
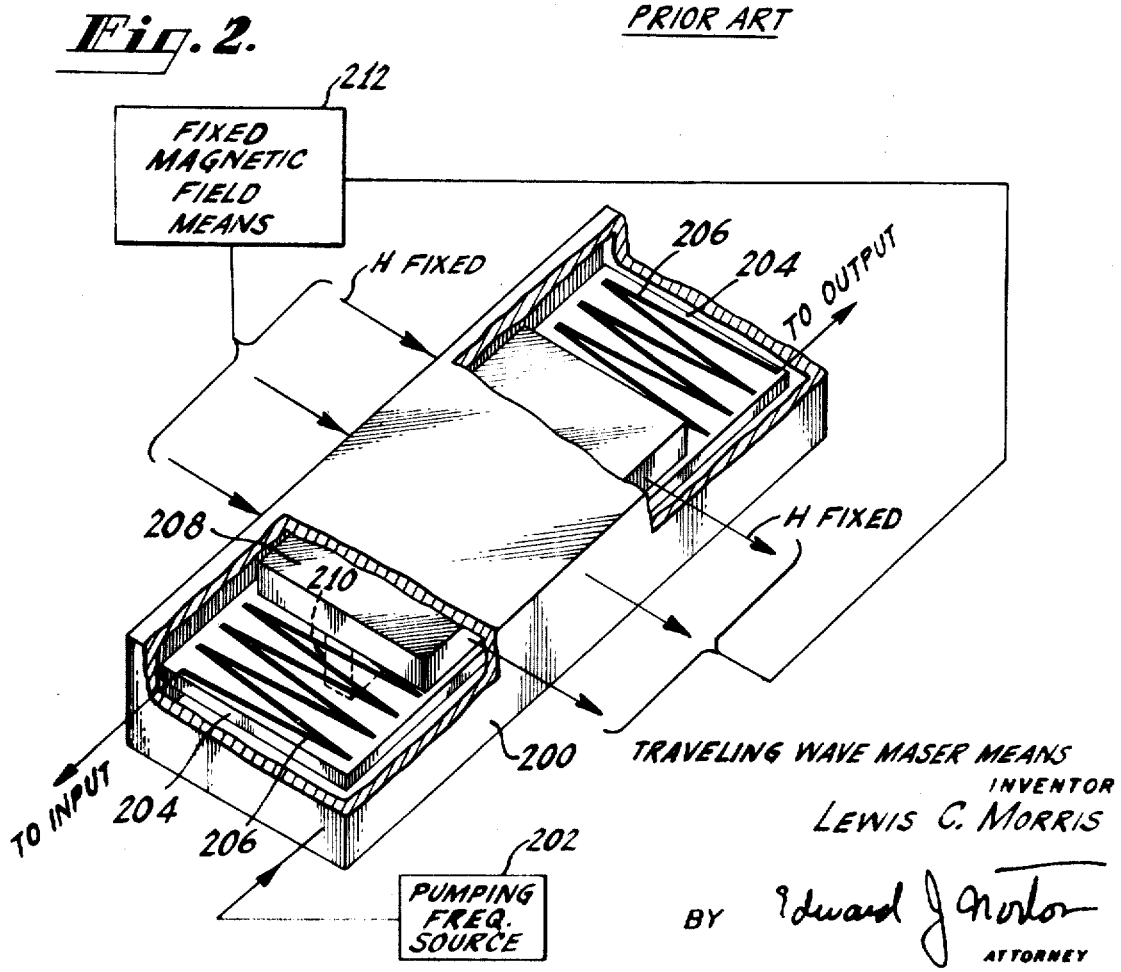
FIG. 2 shows the particular structure of the traveling wave maser means of FIG. 1, as well as of FIGS. 3 and 4.

Referring now to FIG. 2, there is shown the particular structure employed in a conventional traveling wave maser means, such as traveling wave maser means 106. As shown in FIG. 2, a conventional traveling wave maser means comprises waveguide 200 into which pump energy is supplied by a pumping frequency source 202. Within waveguide 200 is circuit board 204 which supports meander line 206. On one side of circuit board 204, in cooperative relationship with meander line 206, is a negative temperature medium 208 made of a crystal such as iron doped rutile ($Fe^{+3}$ $TiO_2$), for instance. On the other side of circuit board 204 is ferrite isolator 210. Fixed magnetic field means 212 applies a predetermined fixed magnetic field transverse to the axis of waveguide 200 in cooperative relationship with negative temperature medium 208. The input signal is applied to the meander line 206 at the left end thereof, and propagates in a traveling wave mode along line 206 to produce an output at the right end of line 206. Although not shown, a traveling wave maser means is typically used in a cryogenic environment to obtain low noise performance.

As is well known in the maser art, a maser is tuned to a frequency which depends upon the material of which the negative temperature medium is composed and the strength and direction of the magnetic field applied to the negative temperature medium.

Figure 3:
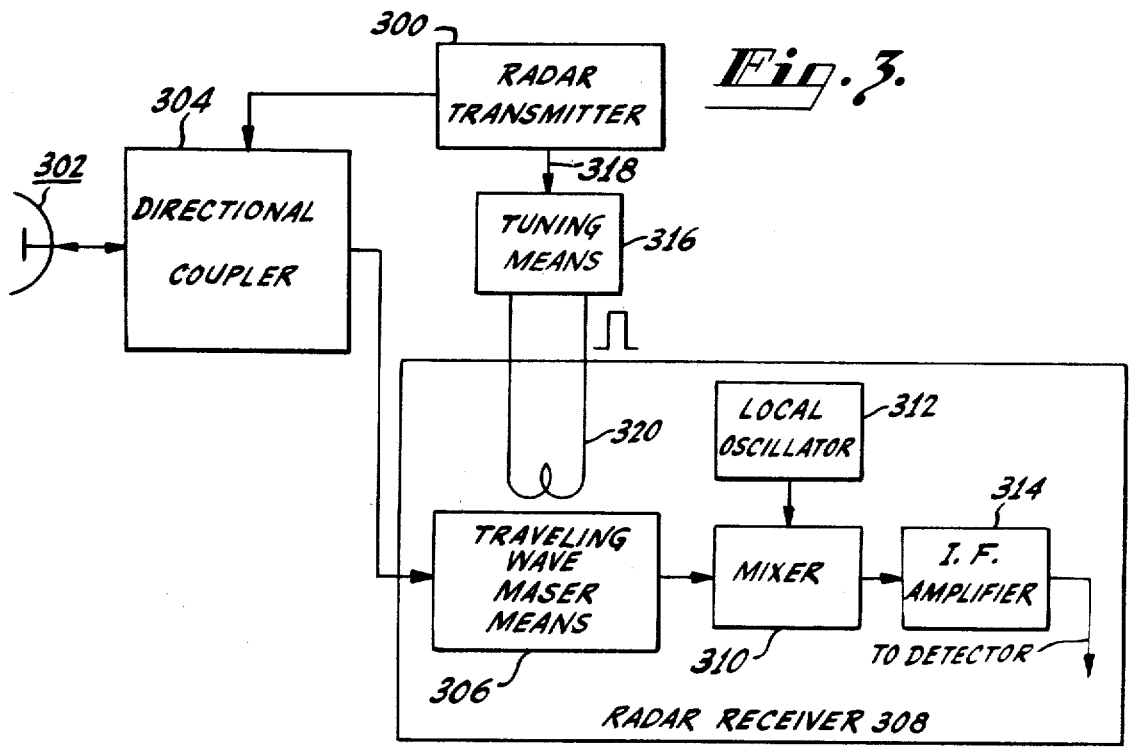
FIG. 3 is a block diagram of a radar system made in accordance with the present invention.

Referring now to FIG. 3, there is shown a radar system employing a traveling wave maser means as the first stage of the receiver thereof which is made in accordance with the principles of the present invention. More particularly, exploratory pulses from radar transmitter 300 are applied to antenna 302 through directional coupler 304. Echo pulses received by antenna 302 are applied to the input of traveling wave maser means 306 of radar receiver 308 through directional coupler 304. A low loss (20 db.) duplexer may be substituted for coupler 304. Radar receiver 308 further includes mixer 310 having the output of traveling wave maser means 306 applied as a first input thereto and having the output of local oscillator 312 applied as a second input thereto. The output of mixer 310 is applied to the input of I.F. amplifier 314, and the output of I.F. amplifier 314 is applied to the detector of radar receiver 308 and then to the readout of the radar (not shown). Radar transmitter 300, simultaneous with the application of each exploratory pulse therefrom to antenna 302 through directional coupler 304, also applies a control pulse to tuning means 316 over conductor 318. In response thereto, tuning means 316 applies a current pulse to coil 320 which is in cooperative relationship with the negative temperature medium of traveling wave maser means 306. This current pulse occurs only during the time of transmission of each exploratory pulse.

Traveling wave maser means 306, except for coil 320, is identical in structure to the traveling wave maser means shown in FIG. 2. Coil 320, which produces a magnetic field during each current pulse therethrough, may be oriented to provide magnetic field components parallel to and/or perpendicular to the fixed magnetic field provided by fixed magnetic field means 212, shown in FIG. 2. Any component of the magnetic field provided by coil 320 which is parallel to the fixed magnetic field provided by means 212 alters the magnitude of the magnetic field applied in cooperative relationship with negative temperature medium 208, but does not change the direction of the magnetic field. On the other hand, any component of the magnetic field provided by coil 320 which is perpendicular to the fixed magnetic field provided by means 212 rotates the total resultant magnetic field which is in cooperative relationship with negative temperature medium 208. In either case, however, the frequency to which the traveling wave maser means is tuned will be shifted during the presence of the current pulse through coil 320.

By making the predetermined value of the fixed magnetic field provided by means 212 such that traveling wave maser means 306, in the absence of a current pulse through coil 320, is tuned to the frequency of the exploratory pulses transmitted and the echo pulses received by antenna 302, traveling wave maser means 306 is effective in amplifying echo pulses received by antenna 302. However, during the interval in which each exploratory pulse is in the process of being transmitted, a current pulse is applied to coil 320. Therefore, during these intervals, traveling wave maser means 306 is detuned from the operating frequency of radar transmitter 300. Thus, traveling wave maser means 306 will not be effective during the transmission of each exploratory pulse in amplifying any electromagnetic energy at the operating frequency of radar transmitter 300 which may be coupled thereto. In fact, traveling wave maser means 306 when detuned, is effective in attenuating any electromagnetic energy at the frequency of radar transmitter 300 which may be coupled thereto.

By making the inductance of coil 320 very small, while at the same time making the amplitude of the current pulse applied by tuning means 316 very large, the time constant of the circuit associated with coil 320 may be made sufficiently small so that the frequency of traveling wave maser means 306 is tunable at a rate which is at least 10 megahertz per microsecond.

Since traveling wave maser means 306 is effective in attenuating, rather than amplifying, any energy directly coupled thereto during the transmission of each exploratory pulse, the high power transmit-receive isolation means, providing 80–90 db. of attenuation, utilized in FIG. 1, along with the excessive noise contributed thereby, may be eliminated and in its stead simple directional coupler 304, or a low loss duplexer, which provides only 20 db. of attenuation and does not contribute any excessive noise to the input of radar receiver 308, may be substituted therefor. In fact, the only limitation upon the amount of input energy at the frequency of radar transmitter 300 which may be applied to the input of traveling wave maser means 306 is the amount of dissipation which would result in thermal overload of the refrigeration system, not shown, normally utilized to maintain the traveling wave maser means at cryogenic temperatures.

Figure 4:
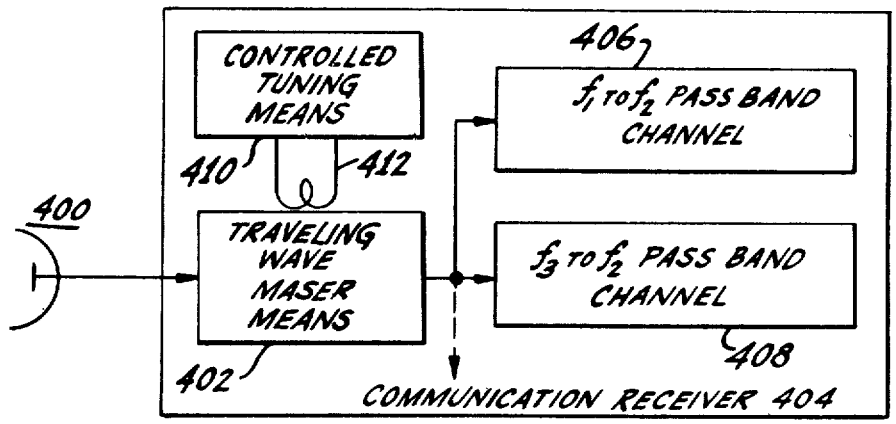
FIG. 4 is a block diagram of a communication receiver made in accordance with the present invention.

Referring now to FIG. 4, there is shown the manner in which the present invention may be applied to a very high gain communication receiver, rather than a radar system. In particular, the electromagnetic energy received by a wide band antenna system 400 is applied to the input of traveling wave maser means 402 of communication receiver 404. Traveling wave maser means 402 is identical in structure to the traveling wave maser means shown in FIG. 2. The output of traveling wave maser means 402 is applied in parallel as an input to each of a plurality of different pass band channels, such as channel 406 having a frequency pass band of frequencies between $f_1$ and $f_2$ and channel 408 having a frequency pass band of frequencies between $f_3$ and $f_2$, for instance. Control tuning means 410 applies a controllable amount of current through coil 412 which is in cooperative relationship with the negative temperature medium of traveling wave maser means 402. By properly controlling the current through the coil 412, traveling wave maser means 402 may be selectively tuned to frequencies in any one of the respective plurality of pass band channels coupled to the output thereof. Since the pass band of each channel is small compared to the total pass band of communication receiver 404, the gain of each channel may be made relatively large while the total noise passing through each respective channel may be made relatively small due to its relatively high selectivity.

Although only certain preferred embodiments of the present invention have been described in detail, it is not intended that the invention be restricted thereto, but that it be limited only by the true spirit and scope of the appended claims.

What is claimed is:

1. In apparatus comprising frequency selective signal translating means including respective first and second portions each of which has an input and an output and in which the output of said first portion is coupled to the input of said second portion; the improvement wherein said second portion has a predetermined frequency pass band, and wherein said first portion comprises maser means which is tunable to a first frequency within said pass band and is tunable to a second frequency outside of said pass band, and tuning means coupled to said maser for tuning said maser means from one of said first and second frequencies to the other of said first and second frequencies at a high rate, wherein said translating means further includes a third portion having an input and an output and in which said input of said third portion is coupled to said output of said first portion, wherein said third portion has a second predetermined frequency pass band which is exclusive of said first-named pass band and wherein said second frequency is within said second pass band.

2. The apparatus defined in claim 1, wherein each of said second and third portions, respectively, comprises separate frequency spaced high gain channels.

3. In apparatus comprising frequency selective signal translating means including respective first and second portions each of which has an input and an output and in which the output of said first portion is coupled to the input of said second portion; the improvement wherein said second portion has a predetermined frequency pass band, and wherein said first portion comprises maser means which is tunable to a first frequency within said pass band and is tunable to a second frequency outside of said pass band, and tuning means coupled to said maser for tuning said maser means from one of said first and second frequencies to the other of said first and second frequencies at a high rate, wherein said maser means comprises a negative temperature body, means for applying pumping energy to said body, and means for applying a fixed Zeeman splitting first magnetic field to said body of that predetermined first magnitude which results in said maser means being tuned to said first frequency, and wherein said tuning means comprises short time constant means for applying in addition to said first magnetic field a time-varying second magnetic field of that instantaneous second magnitude which results in said maser means being tuned to said second frequency in response to said second magnetic field having said second magnitude at a rate of at least 10 megahertz per microsecond.

* * * * *